May 28, 1963  A. J. H. GOODWIN  3,091,103
VIBRATION ISOLATING SHAFT COUPLING
Filed May 5, 1959  5 Sheets-Sheet 1

INVENTOR
Aubrey J. H. Goodwin
BY
Watson, Cole, Grindle & Watson
ATTORNEYS

May 28, 1963  A. J. H. GOODWIN  3,091,103
VIBRATION ISOLATING SHAFT COUPLING
Filed May 5, 1959  5 Sheets-Sheet 5

INVENTOR
Aubrey J. H. Goodwin
BY
Watson, Cole, Grindle & Watson
ATTORNEYS

United States Patent Office 3,091,103
Patented May 28, 1963

3,091,103
VIBRATION ISOLATING SHAFT COUPLING
Aubrey John Hutchinson Goodwin, Shandon, Scotland, assignor to Yarrow and Company Limited, Glasgow, Scotland
Filed May 5, 1959, Ser. No. 811,178
10 Claims. (Cl. 64—26)

This invention relates to vibration isolators, that is to say, devices for isolating from a first body a periodic force applied to a second body while at the same time transmitting to the first body a constant force applied to the second body.

Throughout the specification, the term "periodic force" is used to mean a force that varies periodically with respect to time or a component of a force, which component varies periodically with respect to time, the term "constant force" is used to mean either a force that remains substantially constant over a single period of the periodic force or a component of a force, which component remains substantially constant over a single period of the periodic force, and the term "isolating" is used to include both not transmitting at all and transmitting with attenuation.

The second body may be, for example, a machine and the first body may be a supoprt for the machine. The vibration isolator would then serve to isolate from the support periodic forces arising from the operation of the machine while at the same time supporting or partially supporting the machine by transmittting the weight, or a part of the weight, of the machine to the support.

An important application of vibration isolators is for mounting the engines of vehicles and vessels. In this case, in addition to a periodic force arising from the operation of the engine and the constant force arising from the weight of the engine, forces arise from the movement of the vehicle or vessel, but such forces usually do not vary significantly over a single period of the periodic force and therefore they form part of the constant force that the vibration isolator must be able to transmit.

Another use of vibration isolators arises when it is desired to transmit motion from one body to another. Thus, for example, when it is desired to transmit rotary motion from a driving shaft to a driven shaft and either the driving torque applied to the driving shaft or the load on the driven shaft varies periodically about a value that remains substantially constant over a single period of the varying component of the torque, a rotary coupling incorporating one or more vibration isolators may be interposed between the driving and driven shafts to transmit the constant component of the torque while at the same time isolating the periodic component.

The effectiveness of a vibration isolator is measured by its transmissibility, which is defined as the ratio of the force transmitted by the vibration isolator to the force applied to the body. When the applied force is constant, the transmissibility is unity and the displacement of the body is inversely proportional to the static stiffness, which it is desirable should be as large as possible. The transmissibility of the vibration isolator for the periodic force should, however, be as small as possible.

The following is a list of symbols which are used in the specification and claims together with the meanings assigned to them:

$A_0$—Effective cross-sectional area of the variable-volume container.
$A_1$ and $A_2$—Cross-sectional areas of the ducts to the first and second vessels respectively.
$B_1$ and $B_2$—Bulk moduli of the fluids in the first and second vessel respectively.
$C_1$ and $C_2$—Damping effects of the fluids in the ducts of the first and second vessel and duct systems respectively referred to the variable-volume container.
$F_0$—Amplitude of the applied periodic force.
$F_s$—Amplitude of the periodic force transmitted to the the first body.
$K_0$—Static stiffness of a complete vibration mounting.
$K_1$ and $K_2$—Static stiffnesses of the first and second vessel and duct systems respectively referred to the variable-volume container.
$K_A$, $K_B$ and $K_R$—Static stiffnesses of the component conventional type vibration isolators.
$L_1$ and $L_2$—Lengths of the ducts to the first and second fluid-containing vessels respectively.
M—Mounted mass per mounting.
$M_B$—Intermediate mass per mounting.
$V_1$ and $V_2$—Capacities of the first and second fluid-containing vessels respectively.
X—Maximum value of the ratio $$\frac{F_s}{F_0}$$

Y—Factor by which the best attenuation of a fluid vibration isolator exceeds the attenuation, at a given frequency, of an equivalent conventional isolator.
g—Gravitational acceleration.
$i$—$\sqrt{-1}$
$m_1$ and $m_2$—Virtual masses of the fluids in the ducts of the first and second vessel and duct systems respectively referred to the variable-volume container.
p—Pressure of the fluid in the variable-volume container.
$q_2$—Stiffness ratio $$\frac{K_2}{K_1}$$

$q_B$—Stiffness ratio $$\frac{K_B}{K_1}$$

$q_R$—Stiffness ratio $$\frac{K_R}{K_1}$$

r—The proportion of the fluid in the variable-volume container working, at any particular frequency, in association with the first fluid-containing vessel of a fluid vibration having two such vessels.
S—Stiffness ratio $$\frac{K_B}{K_A}$$

t—Time.
$x_1$—Displacement of the mounted mass from the equilibrium position.
$x_2$—Displacement of the intermediate mass from the equilibrium position.
y—Displacement from the equilibrium position of the junction between a fluid vibration isolator and the convention vibration isolator.
sin $\omega t$—Periodic function of the applied periodic force.
$\Delta_0$—Static deflection of the mounted mass under gravity.
$\gamma$—Forcing frequency ratio for a conventional two-mass vibration isolator $$=\sqrt{\omega^2\left[\frac{M}{K_A}+\frac{M+M_B}{K_B}\right]}$$

$\gamma_1$—Forcing frequency ratio for the first fluid-containing vessel and associated duct of a fluid vibration isolator incorporating two such vessels $$=\sqrt{\omega^2\frac{m_1}{K_1}}$$

$\gamma_2$—Forcing frequency ratio for the second fluid-containing vessel and associated duct of a fluid vibration isolator incorporating two such vessels $$=\sqrt{\omega^2 \frac{m_2}{K_2}}$$

$\gamma_0$—Forcing frequency ratio for a complete vibration isolator $$=\sqrt{\omega^2 \frac{M}{K_0}}$$

$\lambda_1$—Mass ratio $$\frac{M}{m_1}$$

$\lambda_2$—Mass ratio $$\frac{M}{m_2}$$

$\lambda_B$—Mass ratio $$\frac{M}{M_B}$$

$\mu_1$ and $\mu_2$—Coefficients of viscosity of the fluids in the ducts associated with the first and second fluid-containing vessels respectively.

$\nu_1$ and $\nu_2$—Kinematic viscosities of the fluids in the ducts associated with the first and second fluid-containing vessels respectively.

$\rho_1$ and $\rho_2$—Densities of the fluids in the ducts associated with the first and second fluid-containing vessels respectively.

$\omega$—Frequency of the applied periodic force measured in radians per unit time.

$\omega_x$—Frequency of the applied periodic force at which maximum amplification occurs measured in radians per unit time.

$\omega_y$—Frequency of the applied periodic force at which best attenuation occurs measured.

$n$—Exponent of polytropic expansion and compression of a gas used in a fluid-vibration isolator.

In addition to being used to refer to the first vessel and duct system of a fluid vibration isolator having two fluid-containing vessels, the symbols having the suffix 1 are also used to refer to the vessel system of a fluid vibration isolator having only one such vessel.

In order to explain the nature of the problem with which the invention is concerned and to assist in the understanding of the invention, the operation of three forms of anti-vibration mounting that have previously been proposed will now be described in some detail with reference to FIGS. 1A, 1B, 1C and 2 of the accompanying drawings in which.

Throughout the description of the three known forms of anti-vibration mounting, the effects of damping are neglected. In practice, some damping will always be present and this eliminates the sudden phase changes and infinite amplitude that occurs at resonances according to the simplified theory given below, and also reduces the optimum attenuation given by the mounting. The presence of a small degree of damping does not, however, materially alter the behaviour of the mounting when the mounting is not in resonance with the applied periodic force.

The simplest form of anti-vibration mounting is a system having resilience and negligible mass, and such a vibration isolator will hereinafter be referred to as a simple conventional vibration isolator. The transmissibility of such isolators, of which springs and rubber blocks are examples, is a function of the dynamic stiffness (which is assumed for the sake of simplicity to be equal to the static stiffness) of the vibration isolator, the inertia of the body to which the periodic force is applied, and the frequency of the applied force.

Figure 1A:
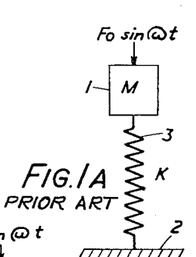
FIG. 1A shows schematically a simple conventional vibration isolator.

Referring to FIG. 1A of the drawings, a periodic force applied to the body 1 is isolated from the support 2 by a simple conventional vibration isolator, which is shown as a spring 3. The force applied to the body 1 causes the body 1 to be displaced from the position that it would occupy if no force were applied to it and the spring 3 were consequently not under load (except for the constant force). This displacement of the body 1 gives rise to two forces: the inertia force of the body 1 (which is proportional to the square of the frequency of the periodic movement of the body 1 and to the displacement of the body 1), and the force arising from the static stiffness of the spring 3 which is exerted equally and oppositely on the body 1 and the support 2. The inertia force, however, acts only upon the body 1. Accordingly, the transmissibility of the vibration isolator depends upon the relative magnitudes and phases of these two forces in relation to the applied force.

At low frequencies, the inertia force is negligible and therefore the stiffness of the spring 3 has to oppose the whole of the applied force. The transmissibility of the vibration isolator under these conditions is effectively unity. In other words, it transmits a constant force without attenuation.

As the frequency rises, the inertia force of the body is initially less than the force exerted by the spring 3, and this implies that the displacement of the body 1 (and consequently the inertia force of the body 1) shall be in phase with the applied force. Under these conditions, the stiffness of the spring 3 has to balance both the applied force and the inertia force of the body 1. Accordingly, the force exerted by the spring 3 has to be larger than in the static case and the transmissibility of the isolator is greater than unity. As the frequency increases further, the transmissibility continues to increase until the inertia force of the body 1 becomes equal in magnitude to the force exerted by the spring 3. At the frequency at which this occurs, the system is said to be in resonance and the displacement of the body 1 (and consequently the transmissibility of the isolator) becomes indefinitely large. Under these conditions, the applied force is not opposed at all because the inertia force of the body 1 and the stiffness of the spring 3 exactly balance each other.

Above the resonant frequency, the inertia force of the body 1 becomes larger than the force exerted by the spring 3, which implies that the displacement of the body 1 (and consequently the inertia force of the body 1) shall be in antiphase with the applied force. The force exerted by the spring 3 is then in phase with the applied force and, consequently, the inertia force of the body 1 has to balance both the applied force and the force exerted by the spring 3. For frequencies only slightly above the resonant frequency, this implies that the maximum displacement of the body 1 (and therefore the transmissibility of the isolator) is large. As the frequency increases further, however, the inertia force of the body 1 (which, as stated above, is proportional to the square of the frequency) increases rapidly so that the inertia force becomes able to balance the applied force and the force exerted by the spring 3 for smaller and smaller maximum displacements of the body 1. This in turn reduces the magnitude of the force exerted by the spring 3, so that the transmissibility of the vibration isolator decreases rapidly.

The frequency at which resonance occurs is a function of the mass of the body 1 and the static stiffness of the spring 3, the resonant frequency increasing with increasing stiffness of the spring 3. Accordingly, the simple conventional vibration isolator suffers from two disadvantages. First, except for frequencies considerably above the resonant frequency of the system, it is not possible to achieve both a low transmissibility and a high static stiffness. Secondly, in order to reach a state in which the vibration isolator is efficient (i.e. the state in which the frequency of the applied force is considerably above the resonant frequency), it is necessary to pass through a region (i.e. the region of resonance) in which the transmissibility is very large. It is possible to reduce the transmissibility of the vibration isolator at resonance by introducing damping, but this increases the transmissibility of the vibration isolator at higher frequencies.

Another form of vibration isolator that has been proposed is a system having resilience and mass, the centre of gravity of the mass being free to move relatively to each of the two bodies to which the vibration isolator is applied. Such a vibration isolator will hereinafter be referred to as a conventional two-mass vibration isolator, the term "two-mass" arising from the fact that the isolator utilises both the inertia force of the body to which the periodic force is applied and the inertia force of the vibration isolator itself.

Figure 1B:
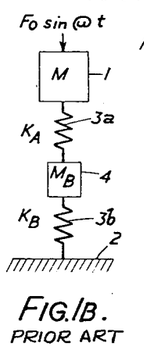
FIG. 1B shows schematically a conventional two-mass vibration isolator.

Referring to FIG. 1B of the drawings, a periodic force applied to the body 1 is isolated from the support 2, by a conventional two-mas vibration isolator, which consists of springs 3a and 3b, between which there is interposed a massive body 4.

The characteristics of the conventional two-mass vibration isolator differ from those of the simple conventional vibration isolator in that it has two resonant frequencies and that, at frequencies considerably higher than the higher of the two resonant frequencies, a transmissibility much lower than that of a simple conventional vibration isolator having the same static stiffness can be obtained.

The first resonance occurs when the inertia force of the body 1 exactly balances the force exerted by the spring 3a. At frequencies close to this resonant frequency, it requires a very large amplitude of movement of the body 1 in order that the applied periodic force may be balanced by the difference between the inertia force of the body 1 and the force exerted by the spring 3a. This results in a large force being exerted by the spring 3a on the body 4, which therefore has a large amplitude of movement so that large forces are transmitted by the spring 3b to the support 2.

The second resonance occurs when the inertia force of the body 4 exactly balances the resultant of the forces exerted by the springs 3a and 3b. At frequencies close to this resonance frequency, the body 4 has to have a very large amplitude of movement in order that the difference between the inertia force of the body 4 and the resultant of the forces exerted by the springs 3a and 3b shall balance any additional force exerted by the spring 3a resulting from movement of the body 1. Therefore large forces are transmitted by the spring 3b to the support 2.

At frequencies higher than the second resonance frequency, the movement of the body 1 is in antiphase with the applied periodic force and, as in the case of the simple conventional vibration isolator, at very high frequencies only a small amplitude of movement of the body 1 is required for its inertia force to balance both the applied periodic force and the force exerted on it by the spring 3a. Therefore the spring 3a exerts only small force on the body 4, the inertia force of which balances both this force and the force exerted by the spring 3b with only a very small amplitude of movement of the body 4.

Figure 2:
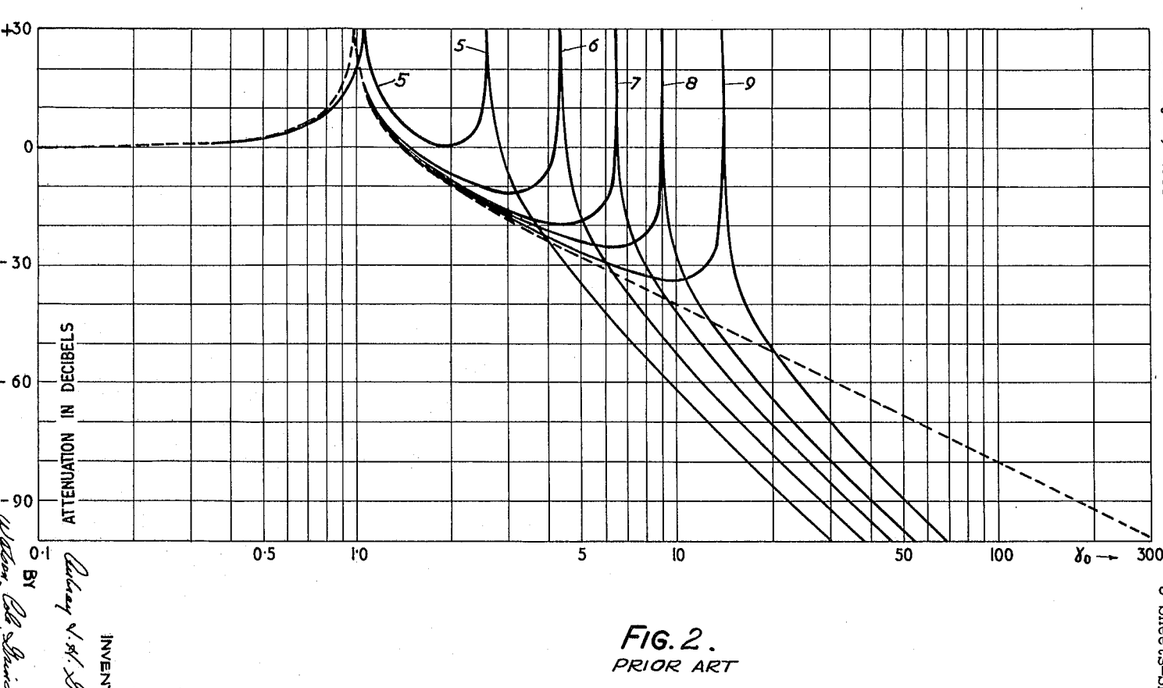
FIG. 2 is a graph comparing the attenuation given by the conventional two-mass vibration isolator shown in FIG. 1B with that given by the simple conventional vibration isolator shown in FIG. 1A over a range of frequencies for different values of the mass ratio of the two-mass vibration isolator.

Thus the transmissibility of the conventional two-mass vibration isolator is very low indeed at high freqencies. In fact, at very high frequencies, the transmissibility of a conventional two-mass vibration isolator is smaller than that of a simple conventional vibration isolator having the same static stiffness by a factor which is approximately proportional to the square of the frequency of the applied periodic force. This is shown in FIG. 2 of the drawings, which is a graph in which the vertical axis represents the attenuation or amplification measured in decibels and the horizontal axis represents $\gamma_0$, which, as will be seen below, is a quantity linearly proportional to the frequency of the applied periodic force. The full curves represent the attenuation given by conventional two-mass vibration isolators having the same static stiffness, but different values of $\lambda_B$ (the ratio of the mass M of the body 1, to the mass $M_B$ of the body 4). The broken curve represents the attenuation given by a simple conventional vibration isolator having the same static stiffness. The curve 5 represents the attenuation when $\lambda_B=1$, that is to say, when the mass $M_B$ of the body 4 is equal to the mass M of the body 1. The curves 6, 7, 8 and 9 represent the attenuation when the value of $\lambda_B$ is 4, 10, 20 and 50 respectively.

It will be seen that the performance of the conventional two-mass vibration isolator improves as the value of $\lambda_B$ decreases. As the value of $\lambda_B$ increases (i.e. as the mass $M_B$ of the body 4 decreases), the value of the minimum frequency for which the attenuation provided by the conventional two-mass vibration isolator is better than the attenuation provided by a simple conventional vibration isolator having the same static stiffness, increases. Thus, as $\lambda_B$ increases, it is necessary to operate at higher and higher frequencies in order to obtain satisfactory attenuation.

The conventional two-mass vibration isolator suffers from the same disadvantages as the simple conventional vibration isolator, but gives improved attenuation at high frequencies at the expense of being more massive.

Figure 1C:
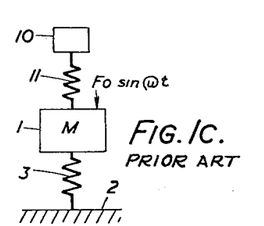
FIG. 1C shows schematically a dynamic vibration absorber.

A further form of anti-vibration mounting that has been proposed is the so-called dynamic vibration absorber. Referring to FIGURE 1C of the drawings, a body 1, to which the periodic force is to be applied, is separated from the support 2 by a spring 3 as in the simple conventional vibration isolator. On the side of the body 1 remote from the support 2 (i.e. above the body 1 in the form of vibration absorber shown in FIGURE 1C) a body 10 is secured to the body 1 through a spring 11.

The dynamic vibration absorber operates in the following way. The periodic force applied to the body 1 causes the body 1 to vibrate and this in turn causes the body 10 to vibrate. At some particular frequency (the resonance frequency of the system consisting of the body 10 and spring 11), the inertia force of the body 10 exactly opposes the said periodic force. At this frequency, the body 1 is held motionless.

The dynamic vibration absorber gives very good attenuation at one particular frequency, but it has two resonances at which the transmissibility is very large and it is only suitable for isolating a periodic force of which the frequency remains accurately constant. Therefore it is not satisfactory as a mounting for variable-speed machines such as, for example, internal combustion engines used as power units for vehicles or vessels.

Thus none of the anti-vibration mountings described above gives the desired combination of a high static stiffness and a low transmissibility, except at high frequencies or at one particular frequency only.

This invention provides a vibration isolator for isolating from a first body a periodic force applied to a second body while at the same time transmitting to the first body a constant force applied to the second body, which vibration isolator comprises a variable-volume fluid-filled container for interposition between the said two bodies, a vessel containing a fluid which provides substantially the whole of the static stiffness of the vibration isolator, conduit means of which the effective cross-sectional area is less than the effective cross-sectional area of the said container, which contains a body of fluid and which communicates with both the interior of the said container and the interior of the said vessel and provides the sole means of such communication, wherein relative movement between the two said bodies in the said one sense causes fluid to flow in the conduit means towards the vessel against the pressure of the fluid in the vessel and relative movement between the said bodies in the opposite sense causes fluid to flow in the conduit means toward the variable-volume container under the action of the pressure of the fluid in the vessel.

Because the apparent bulk modulus of the fluid in the vessel opposes displacement of the body of fluid in the conduit means towards the vessel and relative movement between the bodies under the action of the constant force necessarily produces such a displacement, the force arising from the apparent bulk modulus of the fluid in the vessel opposes relative movement between the two bodies under the action of the constant force. When the frequency of the applied periodic force is very low, the inertia forces of the second body and of the body of fluid in the conduit means are negligibile and the applied periodic force is balanced entirely by the force arising from the apparent bulk modulus of the fluid in the vessel. As the frequency of the applied periodic force increases, however, the said inertia forces also increase until a frequency is reached at which they exactly balance the force arising from the apparent bulk modulus of the fluid in the vessel. At this frequency, the applied periodic force is unopposed and the amplitude of the movement of the second body becomes large, which results in a high transmissibility. As the frequency increases further, the inertia forces become larger than the force arising from the apparent bulk modulus of the fluid in the vessel and partially balance the applied periodic force until a frequency is reached at which the inertia force of the mass of the vibration isolator exactly balances the force exerted on the mass by the resilient means, so that the stiffness of the vibration isolator at this frequency is (neglecting damping) zero, and the second body responds freely to that force. The amplitude of vibration of the second body then reaches a value at which the inertia force of the second body exactly balances the applied periodic force, which is therefore not directly transmitted to the first body.

It will be seen that, while the vibration isolator of the invention resembles the conventional two-mass vibration isolator and the dynamic vibration absorber in that it has a significant mass (that of the body of fluid in the conduit means) which gives rise to an inertia force, it is distinguished structurally from them by the fact that, in the vibration isolator of the invention, the mass of the vibration isolator is not resiliently connected to the bodies between which it acts. Further, the three anti-vibration mountings described above and the vibration isolator of the invention operate in fundamentally different ways. The principles of operation of the devices may be summarised as follows:

(1) In the simple conventional vibration isolator operating at frequencies well above the resonance frequency, the applied force and the force resulting from the stiffness of the vibration isolator are in phase and their resultant is balanced by the inertia force of the second body.

(2) The principle of operation of the conventional two-mass vibration isolator is similar to that of the simple conventional vibration isolator, but the mass of the vibration isolator itself gives rise to an inertia force that provides additional attenuation.

(3) In the dynamic vibration absorber operating at the frequency of best attenuation, the inertia force of the additional mass exactly balances the applied force. Thus the second body remains stationary and has no inertia force. The static stiffness of the vibration absorber does not give rise to any periodic force because the body that it supports remains stationary.

(4) In the vibration isolator of the invention operating at the frequency of best attenuation, the inertia force of the body of fluid in the conduit means exactly balances the periodic force arising from the static stiffness of the vibration isolator, and the inertia force of the second body exactly balances the applied force.

Although the transmissibility of the vibration isolator of the invention at resonance is (neglecting damping) zero, it is necessary to provide a support for the resilient means and a residual periodic force is transmitted to that support through the resilient means. This residual periodic force may, however, be reduced or eliminated as will be described below.

In all forms of the vibration isolator of the invention, it is essential that the vibration isolator should be suitably damped in accordance with the purpose to which it is to be applied, and this is discussed in greater detail below.

The variable-volume fluid-filled container may comprise a cylinder fitted with a piston slidable therein and filled, on one side of the piston, with a liquid, but such sliding parts almost inevitably result in some leakage and preferably, the container is, with the exception of an outlet to the conduit means, completely sealed. Thus the container may comprise a chamber fitted with a flexible diaphragm and filled, on one side of the diaphragm, with a liquid, or the container may comprise a flexible bellows filled with a liquid.

The effective cross-sectional area of the variable-volume fluid-filled container is advantageously greater then the effective cross-sectional area of the conduit means so that the magnitude of the displacement of the centre of mass of the fluid in the conduit means caused by a given relative movement between the said bodies is greater than the magnitude of the relative movement. This results in two advantages. First, the inertia of the vibration isolator exceeds the mass of the fluid in the conduit means by a factor equal to the square of the ratio of the two effective cross-sectional areas. Secondly, because the resilient means act directly on the mass, the magnitude of the force which the resilient means has to exert in order to prevent relative movement between the two bodies under the action of a given constant force is less than the magnitude of that constant force. Therefore the residual periodic force referred to above is reduced. Thirdly, the relatively large amplitude of movement of the fluid in the conduit means gives rise to a degree of damping that can readily be controlled (by selection of a fluid having an appropriate coefficient of viscosity and a conduit means having an appropriate cross-sectional area) and which is large by comparison with any damping provided by the remainder of the vibration isolator. Further, the introduction of a substantial degree of damping can be achieved with the application of only relatively small forces. The effective cross-sectional area of the container may exceed the effective cross-sectional area of the conduit means by a factor within the range of from 10 to 100. For some applications, this factor advantageously exceeds 100 and, for some applications, it preferably exceeds 1,000.

The fluid in the said vessel may be a liquid and there may be provided in the vessel, in order to reduce the static stiffness of the resilient means, a resilient body of which the bulk modulus is less than the apparent bulk modulus of the liquid in the vessel. The resilient body may be a body of gas which may be contained in a sealed bag. Instead, in order to provide additional resilience when the fluid in the vessel is a liquid, the vessel may be provided with a resilient diaphragm or a resiliently loaded piston or diaphragm.

As has been stated above, it is important that the vibration isolator should be suitably damped for the purpose to which it is to be applied and there may be provided an adjustable throttle valve for varying the magnitude of the viscous damping of the fluid in the conduit means (which usually amounts to substantially all the damping of the vibration isolator, the other sources of damping within the vibration isolator being negligible by comparison).

The non-dimensional quantity $$\frac{C_1^2}{m_1 K_1}$$

may be within the range of from 0.5 to 2.5. For some applications it may be within the range of from 0.05 to 0.5 and for other applications it may be not greater than 0.0001. This quantity is a function of the damping of the vibration isolator and gives a measure of the selectivity of the vibration isolator with respect to the frequency of the applied periodic force. Small values of the quantity correspond to a high selectivity, that is to say, a vibration isolator for which the quantity is small has a very low transmissibility at some particular frequency, but the transmissibility rises sharply on either side of that frequency. A vibration isolator for which the value of the quantity is large, on the other hand, gives a less good performance (i.e. a higher transmissibility) at its optimum frequency of operation, but the transmissibility rises less sharply on either side of the optimum frequency.

Fluid vibration isolators for which the value of $$\frac{C_1^2}{m_1 K_1}$$

is very small (i.e. less than 0.0001) are suitable for use when the frequency of the periodic force remains approximately constant for in this case it is desirable to produce the greatest possible degree of attenuation at the frequency of the applied force. Vibration isolators for which the value of the said quantity is larger (say 0.2 and preferably less than 0.5) are suitable for reducing the amplitude of vibration at resonance of a mechanism having a natural frequency, for example, a body mounted on a conventional vibration isolator. The resulting system has two resonance frequencies, one at a lower and the other at a higher frequency than the natural frequency of the mechanism by itself and it is necessary that the fluid vibration isolator should provide good attenuation over a frequency range which includes both the resonance frequencies of the system.

The invention also provides a vibration isolating device comprising a vibration isolator of the invention connected in series with a simple conventional vibration isolator (as hereinbefore defined), the part of the simple conventional vibration isolator that is connected to the first-mentioned vibration isolator constituting the said second body. Usually, in such a device the simple conventional vibration isolator provides the desired very good attenuation over a range of high frequencies and the purpose of the vibration isolator of the invention is to provide attenuation at what would, in the absence of the vibration isolator of the invention, be the resonance frequency of the system. In fact, the presence of two vibration isolators having different characteristic frequencies results in amplification occurring at two different frequencies and thus the degree of damping of the vibration isolater of the invention has to be sufficiently large to provide a useful degree of attenuation at both these frequencies. A fluid vibration isolator is especially suitable for this purpose and the value of $$\frac{C_1^2}{m_1 K_1}$$

(as hereinafter defined) is advantageously within the range of from 0.05 to 0.5.

The invention further provides a rotary coupling for isolating from a first body a periodic torque applied to a second body while at the same time transmitting to the first body a constant torque applied to the second body, which coupling comprises a first abutment member for connection to the first body, a second abutment member, a rotary coupling for isolating from a first body a periodic torque applied to a second body while at the same time transmitting to the first body a constant torque applied to the second body, which coupling comprises a first abutment member for connection to the first body, a second abutment member for connection to the second body and mounted for rotation relative to the first abutment member, a variable-volume fluid-filled container interposed between the said two abutment members, a vessel containing a fluid, conduit means of which the effective cross-sectional area is less than the effective cross-sectional area of the said container, which contains a body of fluid and which communicates with both the interior of the said container and the interior of the said vessel, a third abutment member fixed with respect to the first abutment member, the arrangement being such that relative rotation between the first and second abutment members in one sense causes the first and second abutment members to approach one another and relative rotation between the first and second abutment members in the reverse sense causes the second and third abutment members to approach one another, a second variable-volume fluid-filled container interposed between the second and third abutment members, a second vessel containing a fluid, and a second conduit means of which the effective cross-sectional area is less than the effective cross-sectional area of the second container, which contains a body of fluid and which communicates with both the interior of the second container and the interior of the second vessel, the mass of the said bodies of fluid contained in the said first and second conduit means, the dimensions of the first and second conduit means, the apparent bulk modulus of the fluids in the first and second vessels and the degree of damping applied to the bodies of fluid contained in the first and second conduit means being such that, at the said particular frequency of the periodic torque, the inertia reactions of the masses of the said bodies of fluid contained in the first and second conduit means substantially balance the forces exerted on those bodies of fluid by the fluid in the first and second vessels.

The invention also provides a rotary coupling for isolating from a first body a periodic torque applied to a second body while at the same time transmitting to the first body a constant torque applied to the second body, which coupling comprises a first member for connection to one of the said bodies, a second member for connection to the other of the said bodies and rotatably mounted coaxially within the first member, a plurality of abutments extending inwards from the first member, a corresponding number of abutments extending outwards from the second member, the said inwardly and outwardly extending abutments being arranged alternately around the circumference of the inner member, a plurality of variable-volume fluid-filled containers interposed one between each pair of adjacent abutments with their directions of expansion and contraction extending substantially circumferentially with respect to the common axis of the first and second members, two vessels, each containing a fluid, a plurality of conduit means, one for each container, the effective cross-sectional area of each of which is less than the effective cross-sectional area of the said containers, each of which contains a body of fluid and each of which communicates with both the interior of one of the said containers and the interior of one of the said vessels, the conduit means communicating with every alternate variable-volume container communicating with one of the said two vessels and the remaining conduit means communicating with the other of the said two vessels, the masses of the said bodies of fluid contained in the conduit means, the dimensions of the conduit means, the apparent bulk modulus of the fluid in each of the two vessels and the degree of damping applied to the body of fluid contained in each of the said conduit means being such that, at a particular frequency of the periodic torque, the inertia reactions of the said bodies of fluid substantially balance the forces exerted on those bodies of fluid by the fluid in the vessels with which the conduit means containing those bodies of fluid communicate. Advantageously, the said two vessels are each formed by cavities in the second member, which cavities have axes that substantially coincide with the axes of the first and second members, and each conduit means is formed, at least in part, by a bore which is formed in the second member and which communicates with the associated variable-volume container at a point adjacent to the outwardly extending abutment that engages that variable-volume container. Preferably, there are also provided two additional conduit means of which one provides communication between the interiors of only the variable-volume containers that are in communication with one of the said vessels and of which the other additional conduit means provides communication between the interiors of only the variable-volume containers that are in communication with the other of the said vessels.

As will be explained in greater detail below, if the rotary coupling is to be used in a transmission system coupling a screw of a vessel to a driving power unit, then the fluid in the or each fluid-containing vessel is advantageously a gas.

Figure 3:
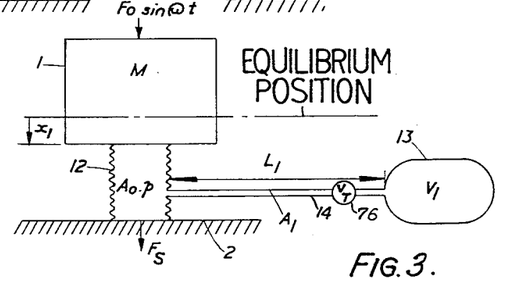
FIG. 3 shows schematically a vibration isolator constructed according to this invention.

Referring to FIGURE 3 of the drawings, a periodic force applied to a second body 1 is isolated from a first body in the form of a support 2 by a fluid vibration isolator. The fluid vibration isolator comprises a flexible bellows 12 of which the upper end supports the body 1 and the lower end rests on the support 2. The hollow interior of the bellows 12 is placed in communication with the interior of a vessel 13 by a conduit in the form of a straight duct 14. The bellows 12, vessel 13 and duct 14 together constitute a closed fluid-filled system. The bellows 12 may be made of rubber, reinforced rubber or thin metal and the vessel 13 and the duct 14 are made of metal of sufficient strength and rigidity to withstand the imposed stresses.

The fluid vibration isolator operates in the following way. Periodic relative movement between the body 1 and the support 2 causes the bellows to expand and contract periodically and this in turn causes the fluid in the duct 14 to flow to and fro against the resilient action of the fluid in the vessel 13. At the resonance frequency of the vibration isolator, the inertia force of the fluid in the duct 14 exactly balances the resilient force applied by the fluid in the vessel 13 so that the bellows 12 have no stiffness and the body 1 vibrates freely.

Figure 4:
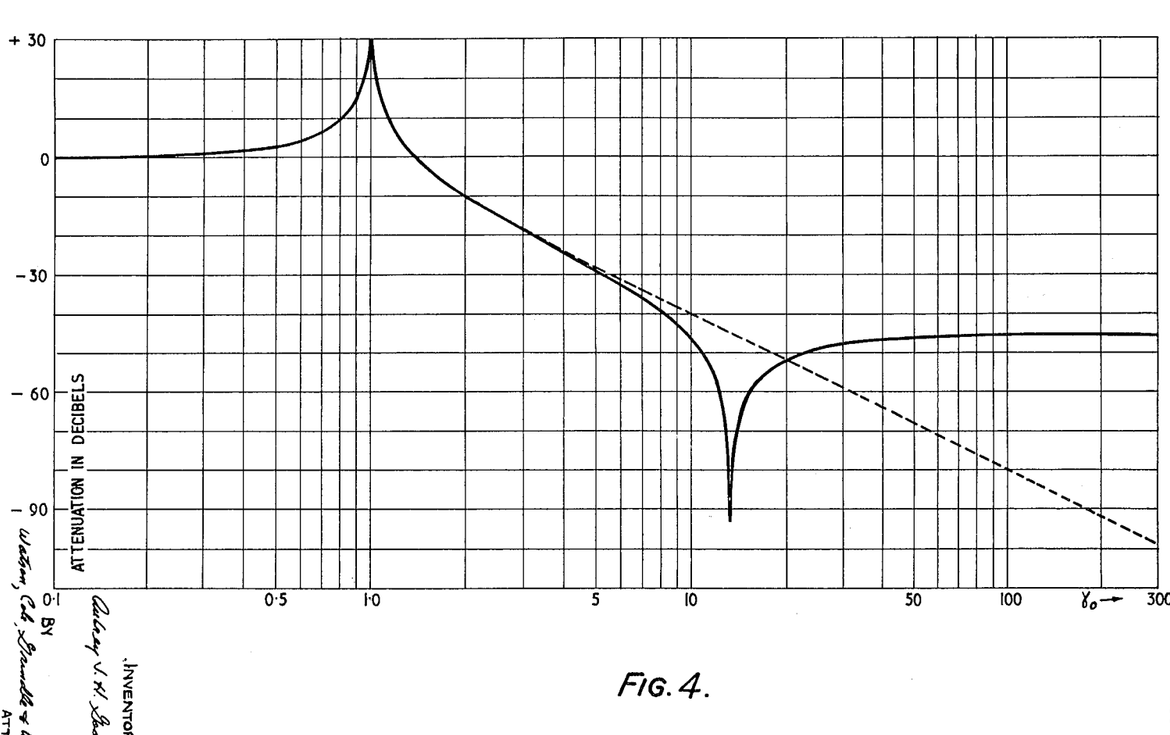
FIG. 4 is a graphical representation of the attenuation produced by the vibration isolator shown in FIG. 3 over a range of frequencies in comparison with the attenuation produced by a simple conventional vibration isolator having the same static stiffness.

The attenuation provided by a vibration isolator of this type is represented by the full curve in FIGURE 4, the broken curve representing the attenuation provided by a simple conventional vibration isolator having the same static stiffness. It will be seen that the transmissibility of the fluid vibration isolator closely follows that of the simple conventional vibration isolator for low frequencies of the applied periodic force and shows the same resonance peak at which the transmissibility is large. Above the resonance frequency, however, the fluid vibration isolator gives, over a small range of frequencies, a greatly reduced transmissibility.

The mathematical analysis of this fluid vibration isolator is as follows:

Equating the forces at the top of the bellows 12 gives:

$$M\ddot{x}_1 = F_0 \sin \omega t - A_0 p \quad (1)$$

Equating the forces in the duct 14 gives:

$$\rho_1 A_1 L_1 \frac{\ddot{x}_1 A_0}{A_1} = A_1 p - \frac{A_0 x_1}{V_1} B_1 A_1 - 8\pi \mu_1 L_1 \frac{A_0 \dot{x}_1}{A_1} \quad (2)$$

Converting Equation 2 to equivalent forces in the bellows 12 by multiplying by $$\frac{A_0}{A_1}$$

gives:

$$\rho_1 A_1 L_1 \left(\frac{A_0}{A_1}\right)^2 \ddot{x}_1 = A_0 p - \frac{A_0^2 B_1}{V_1} x_1 - 8\pi \mu_1 L_1 \left(\frac{A_0}{A_1}\right)^2 \dot{x}_1 \quad (3)$$

or $$m_1 \ddot{x}_1 = A_0 p - K_1 x_1 - C_1 \dot{x}_1 \quad (4)$$

Where $$\rho_1 A_1 L_1 \left(\frac{A_0}{A_1}\right)^2 = m_1$$

$$\frac{A_0^2 B_1}{V_1} = K_1$$

and $$8\pi \mu_1 L_1 \left(\frac{A_0}{A_1}\right)^2 = C_1$$

Adding equations 1 and 4 gives:

$$M\ddot{x}_1 + m_1 \ddot{x}_1 = F_0 \sin \omega t - K_1 x_1 - C_1 \dot{x}_1 \quad (5)$$

Assuming that the motion is simple harmonic and considering amplitudes of the forces gives:

$$F_0 = x_1 (K_1 - m_1 \omega^2 - M\omega^2 + iC_1 \omega) \quad (6)$$

and $$F_s = A_0 p \quad (7)$$

but from Equation 4:

$$A_0 p = x_1 (K_1 - m_1 \omega^2 + iC_1 \omega) \quad (8)$$

From Equations 6, 7 and 8 it follows that:

$$\frac{F_s}{F_0} = \frac{x_1([K_1 - m_1 \omega^2] + iC_1 \omega)}{x_1([K_1 - m_1 \omega^2 - M\omega^2] + iC_1 \omega)} \quad (9)$$

This can be transformed to:

$$\frac{F_s}{F_0} = \sqrt{\frac{(K_1 - m_1 \omega^2)^2 + C_1^2 \omega^2}{(K_1 - m_1 \omega^2 - M\omega^2)^2 + C_1^2 \omega^2}} \quad (10)$$

Dividing Equation 10 by $K_1^2$ gives:

$$\frac{F_s}{F_0} = \sqrt{\frac{\left(1 - \frac{m_1 \omega^2}{K_1}\right)^2 + \frac{C_1^2 m_1 \omega^2}{m_1 K_1 K_1}}{\left(1 - \frac{m_1 \omega^2}{K_1} - \frac{m_1 \omega^2 M}{K_1 m_1}\right)^2 + \frac{C^2 m_1 \omega^2}{m_1 K_1 K_1}}} \quad (11)$$

Whence $$\frac{F_s}{F_0} = \sqrt{\frac{(1 - \gamma_1^2)^2 + \frac{C_1^2}{m_1 K_1} \gamma_1^2}{(1 - \gamma_1^2 - \lambda_1 \gamma_1^2)^2 + \frac{C_1^2}{m_1 K_1} \gamma_1^2}} \quad (12)$$

Where $$\gamma_1^2 = \frac{m_1 \omega^2}{K_1} \text{ and } \lambda_1 = \frac{M}{m_1}$$

The value of $$\frac{F_s}{F_0}$$

tends to a minimum (i.e. the vibration isolator gives best attenuation) when $$1-\gamma_1^2=0 \text{ or } \gamma_1^2=1$$

It should be noted that this gives:

$$K_1 = m_1 \omega^2$$

Thus, as explained qualitatively above, the vibration isolator gives best attenuation when the inertia force of the fluid in the duct 14 exactly balances the force resulting from the static stiffness of the vibration isolator.

Putting $\gamma_1^2=1$ in Equation 12 gives:

$$\frac{F_s}{F_0}(\min) = \sqrt{\frac{\frac{C_1^2}{m_1 K_1}}{\lambda_1^2 + \frac{C_1^2}{m_1 K_1}}} \quad (13)$$

The attenuation at this frequency given by a simple conventional vibration isolator of the same static stiffness can be shown to be approximately $$\frac{1}{\lambda_1}$$

when $\lambda_1$ is large. Thus, if the fluid vibration isolator is to give at this frequency an attenuation Y times greater than the simple conventional vibration isolator, the following relationship must hold:

$$\frac{1}{Y^2 \lambda_1^2} = \frac{\frac{C_1^2}{m_1 K_1}}{\lambda_1^2 + \frac{C_1^2}{m_1 K_1}} \quad (14)$$

Therefore $$\frac{C_1^2}{m_1 K_1} = \frac{\lambda_1^2}{Y^2 \lambda_1^2 - 1} \simeq \frac{1}{Y^2} \quad (15)$$

The value of $$\frac{F_s}{F_0}$$

tends to a maximum (i.e. the vibration isolator gives maximum amplification) when $$1-\gamma_1^2-\lambda_1\gamma_1^2=0$$

i.e. when $$\gamma_1^2 = \frac{1}{1+\lambda_1}$$

Dividing Equation 12 by $\gamma_1^2$, putting $$\gamma_1^2 = \frac{1}{1+\lambda_1}$$

and substituting for $$\frac{C_1^2}{m_1 K_1}$$

from Equation 15 gives:

$$\frac{F_s}{F_0}(\text{Max}) = \sqrt{\frac{\frac{\lambda_1^2}{1+\lambda_1} + \frac{\lambda_1^2}{Y^2 \lambda_1^2 - 1}}{\frac{\lambda_1^2}{Y^2 \lambda_1^2 - 1}}} = X$$

whence $$X^2 = \frac{Y^2 \lambda_1^2 - 1}{1+\lambda_1} + 1$$

Now $\lambda_1$ is large and therefor $X \simeq Y \sqrt{\lambda_1}$. Thus, if Y is to be greater than 1 (i.e. if the single-vessel fluid vibration isolator is to show any advantage over a simple conventional vibration isolator having the same static stiffness) then X must be greater than $\sqrt{\lambda_1}$. Further, if it is required that Y shall be very large (i.e. that the attenuation at the optimum frequency shall be very good), X must be correspondingly large (i.e. the maximum amplification given by the vibration isolator must be correspondingly large). Thus, in designing a single-vessel fluid vibration isolator for any particular application, a compromise has to be made between having very good optimum attenuation, which gives large maximum amplification at some other frequency, and having low maximum amplification, which gives poor optimum attenuation.

The procedure in designing a single-vessel fluid vibration isolator for some particular application may be summarised as follows —M, $A_0$ and $\Delta_0$ will be known, and we have:

$$K_1 = 2\frac{Mg}{\Delta_0}$$

and $$V_1 = \frac{A_0^2 B_1}{K_1}$$

In order to find $V_1$, the fluid to be used in the system must first be selected. If a gas is used then $B_1 = np$ where p is the absolute pressure. Initially, n may be assumed to be unity. Subsequently, its exact value should be determined experimentally. Therefore, with a gas filled system, we have:

$$V_1 = \frac{A_0^2 p}{K_1}$$

Now $$m_1 = \rho_1 A_1 L_1 \left(\frac{A_0}{A_1}\right)^2$$

and therefore $$\frac{L_1}{A_1} = \frac{m_1}{A_0^2 \rho_1}$$

Also $$m_1 = \frac{K_1}{\omega y^2}$$

(where $\omega_y$ is the frequency at which best attenuation is required). Thus, by assuming a value of $A_1$, it is possible to find $L_1$. Substituting for $C_1$, $m_1$ and $K_1$ in Equation 15 gives:

$$\frac{1}{Y^2} \simeq \frac{(8\pi\nu_1)^2}{\omega y^2 A_1^2}$$

or $$Y \simeq \frac{A_1 f_y}{4\nu_1}$$

(where $f_y$ is the frequency in cycles per second at which best attenuation is required). From this relation it is possible to see whether or not the assumed value of $A_1$ in fact gives the required degree of attenuation. The value of $\lambda_1$ may be derived from the relation $$\lambda_1 = \frac{M}{m_1}$$

and then the value of X may be found from the relation $$X = Y\sqrt{\lambda_1}$$

Thus it is possible to see whether or not the assumed value of $A_1$ is satisfactory from the point of view of the maximum permissible amplfication.

If it does not prove to be possible to achieve the desired optimum attenuation without exceeding the maximum permissible amplification, then it is necessary to use a more complicated system such as, for example, a two-vessel fluid vibration isolator.

The following example illustrates the application of a single-vessel fluid vibration isolator to the mounting of a 6 cylinder 4-stroke diesel engine. The isolator is to support a weight of 1,000 lbs. and is to give best attenuation at a frequency of 50 cycles per second, which is the firing frequency when the engine is running at a speed of 1,000 r.p.m. Further, the deflection of the vibration isolator under the static load of 1,000 lbs. is to be 0.75 inch when the pressure in the bellows is 50 pounds per square inch gauge.

In the following calculation, the numbers are given to a greater number of significant figures than would be justified in practice, in order to indicate clearly the method of calculation.

Then
$$M = 1000 \text{ lbs.}$$

$$A_0 = \frac{1000}{50} = 20 \text{ square inches}$$

and
$$\Delta_0 = 0.75 \text{ inch}$$

Therefore
$$K_1 = \frac{Mg}{\Delta_0} = \frac{1000}{0.75} = 1333 \text{ lbs./inch}$$

If air is used in the duct 14 and vessel 13, and liquid is used in the bellows 12, then $$V_1 = \frac{A_0^2 p}{K_1} = \frac{(20)^2(50+14.69)}{1333} = 19.4 \text{ cubic inches}$$

For air at a pressure of 50 pounds per square inch gauge and a temperature of 80° F.

$$\rho_1 = 0.0001782 \text{ pound per cubic inch}$$
$$\nu_1 = 0.00553 \text{ square inch per second}$$

Now
$$m_1 = \frac{K_1}{\omega_Y^2} = \frac{1333 \times 32.2 \times 12}{(2\pi \times 50)^2} = 5.217 \text{ pounds}$$

Therefore
$$\frac{L_1}{A_1} = \frac{m_1}{A_0^2 \rho_1} = \frac{5.217}{(20)^2 \times 0.0001872} = 69.67 \text{ reciprocal inches}$$

Selecting $A_1 = 0.1$ square inch makes $L_1 = 6.967$ inches. Then $$Y \simeq \frac{A_1 f_y}{4\nu_1} \simeq \frac{0.1 \times 50}{4 \times 0.00553} \simeq 47.1 \text{ db}$$

That is, the attenuation at a frequency of 50 cycles per second is 47.1 db beyond that achieved by a simple conventional vibration isolator of equal static stiffness. With this value of $A_1$:

$$\lambda_1 = \frac{M}{m_1} = \frac{1000}{5.217} = 191.7$$

Therefore
$$X = Y\sqrt{\lambda_1} = 226 \times \sqrt{191.7}$$

Hence
$$X = 3129 = 69.91 \text{ db}$$

$$f_x = \frac{f_y}{\sqrt{1+\lambda_1}}$$

$$= \frac{50}{\sqrt{1+191.7}}$$

$$= 3.6 \text{ cycles per second}$$

That is, with this value of $A_1$, the system will experience a maximum amplification of about 69.91 db when the frequency of the applied force is 3.6 cycles per second (i.e. when the engine speed is 72 r.p.m.).

Referring to FIGURE 4 of the drawings, the full curve represents the attenuation provided by the vibration isolator in the above example. The curve also represents, however, the attenuation provided by a fluid vibration isolator that incorporates a single vessel only and for which $$\frac{K_1}{m_1} = \frac{74065}{\Delta_0 \text{ inches}} \text{ and } \frac{C_1^2}{m_1 K_1} = 0.00002$$

The frequency of the applied periodic force is related to $\gamma_0$ by the following general formula:

Frequency of the applied periodic force $$= \frac{3.129}{\sqrt{\Delta_0 \text{ inches}}} \gamma_0 \text{ cycles per second.}$$

Figure 5:
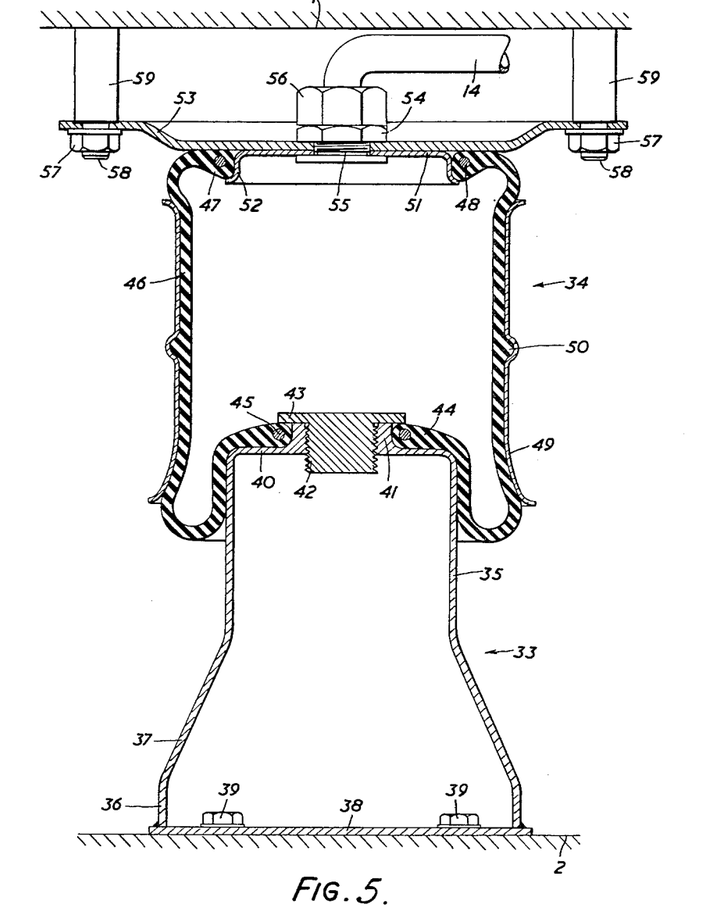
FIG. 5 is an axial section of a plunge and band assembly suitable for use as a variable-volume container of a fluid vibration isolator.

In the vibration isolator shown in FIGURE 3 of the drawings, the bellows 12 may be replaced by the plunger-and-barrel assembly shown in FIGURE 5 of the drawings.

The assembly comprises a hollow rigid plunger indicated generally by the reference numeral 33 and a flexible barrel, indicated generally by the reference numeral 34.

The upper and lower parts, 35 and 36 respectively, of the plunger side wall are each cylindrical in shape and the middle part 37 is of frusto-conical form tapering upwardly so that the diameter of the upper cylindrical part 35 is less than that of the lower part 36. At its lower edge, the lower cylindrical part 36 is welded to the upper surface of a circular base plate 38, which can be secured to the support 2 by, for example, bolts 39. At the upper end of the upper part 35 of the plunger side wall, there is an inwardly extending annular flange 40 of which the inner part is of increased thickness and forms an annular boss 41, which is internally screw-threaded to receive a plug 42. Extending outwardly from the upper end of the plug 42 is an annular flange 43 of which the outer diameter is greater than the outer diameter of the boss 41.

The side and bottom walls of the barrel 34 are formed by a single member, which is of generally tubular form and is made of rubber or other suitable flexible material. The lower end portion 44 of this flexible member, which is of increased thickness and has embedded in it a metal reinforcing ring 45, is clamped between the annular flange 40 at the top of the plunger 33 and the annular flange on the plug 42.

From its lower end, the flexible member extends outwards over the upper surface of the annular flange 40 and turns downwards over the rounded edge formed where the upper part 35 of the plunger side wall meets the flange 40. The outer surface of the flexible member here makes a close fit round the upper cylindrical part 35 of the plunger side wall before the member turns outwardly and then upwardly to form the barrel side wall 46. At the upper end of the barrel side wall 46, the flexible member turns inwards and terminates in a thickened end portion 47 which contains a metal reinforcing ring 48.

Surrounding the side wall 46 of the barrel 34 is a reinforcing metal band 49, which serves to prevent any substantial changes in the effective horizontal cross-sectional area of the barrel 34. The band 49 is located axially with respect to the side wall 46 by means of a ridge 50, which is formed in the outer surface of the side wall 46 and engages an annular recess formed by a circumferentially extending bulge in the band 49.

The top end wall of the barrel 34 is formed by a circular metal disc 51, having a central circular aperture. At its periphery, the disc 51 has a flange 52 which extends downwardly to provide a generally cylindrical seating for the upper end portion 47 of the flexible barrel member and terminates in an outwardly extending portion. A circular plate 53 is secured on top of the disc 51 by means of a nut 54 and a bolt 55. The bolt 55 passes through the circular aperture in the disc 51 and through a registering aperture in the plate 53, and has an axial bore passing through it to provide communication between the interior of the barrel 34 and a tube 14, which is secured to the bolt 55 by a union nut 56. Apart from the end portion, the tube 14 is straight and extends horizontally.

The body 1 to which the periodic force is to be applied is secured to the plate 53 by a number of nuts 57 and bolts 58, which are arranged at intervals around the raised peripheral portion of the plate 53, and is spaced from the plate 53 by a number of sleeves 59, one on each bolt 58.

In operation, an increase in the downward force applied to the assembly by the body 1 causes the flexible member of the barrel 34 to roll down over the upper cylindrical part 35 of plunger 33 thereby decreasing the internal volume of the barrel 34. When the force decreases, the flexible member unrolls from the part 35 under the action of the pressure of the fluid within the assembly and the internal volume of the barrel 34 increases. The metal reinforcing band 49 bears a considerable part of the stress resulting from the pressure of the fluid within the barrel 34 and it is possible to arrange that the flexible member has very little stiffness so that as is desired, substantially all the static stiffness of the assembly against axial compression derives from the pressure of the fluid within the barrel.

In the fluid vibration isolator described above, the resilience of the system is derived substantially entirely from the bulk elasticity of the fluid in the vessel or vessels (assuming that the elasticity of the vessel is negligible by comparison with that of the fluid it contains). If desired, however, additional resilience may be provided by incorporating in the vessel a resilient member such as, for example, a spring-loaded piston or diaphragm. In the case of a liquid-filled vessel additional resilience may be provided by having a small quantity of gas in the vessel. The gas may be either free or contained in a flexible and sealed bag.

In order to enable the degree of damping of the fluid vibration isolator shown in FIGURE 3 to be readily adjusted, an adjustable throttle valve 76 may be situated in the duct 14 adjacent to the vessel 13 to which the duct leads. In the case of the vibration isolator shown in FIGURE 3, an adjustable throttle valve 76 may be provided for each or only one of the ducts 14 and 14a. The degree of damping may then be increased or decreased by increasing or decreasing respectively the degree of throttling produced by the valve.

Figure 6:
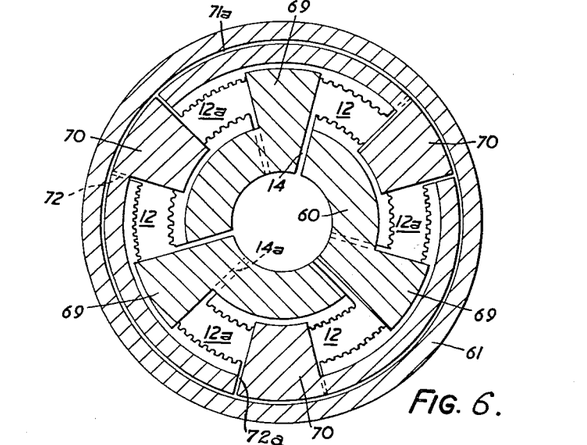
FIG. 6 is a diagrammatic transverse section of a rotary coupling.
Figure 7:
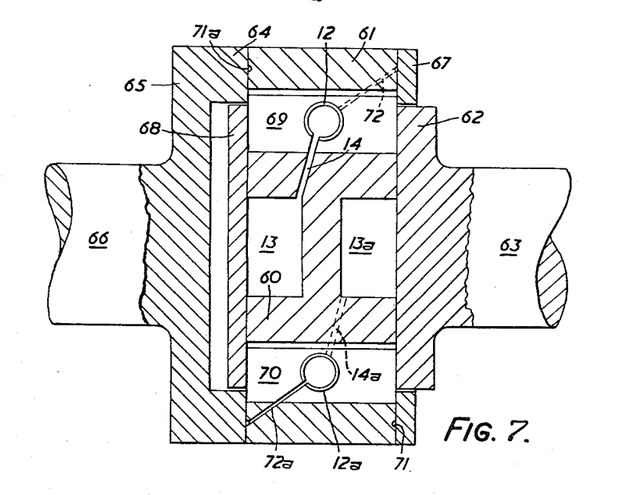
FIG. 7 is a diagrammatic axial section of the rotary coupling shown in FIG. 6.

The rotary coupling shown in FIGURES 6 and 7 of the drawings comprises an inner, generally cylindrical, member 60 mounted coaxially within a hollow cylindrical member 61. The inner member 60 is secured at one end to an enlarged end portion 62 of a shaft 63. The outer member 61 is secured, at the end remote from the shaft 63, to an annular flange 64 which extends from an enlarged end portion 65 of a shaft 66 coaxial with the shaft 63. At the other end, the outer member 61 is secured to an annular member 67 within which the enlarged end portion 62 of the shaft 63 is rotatably journalled. Secured to the inner member 60 at the end towards the shaft 66 is a circular keeper plate 68, which is rotatably journalled within the annular flange 64.

The inner member 60 is formed with three ribs 69, which extend radially outwards and which are equally spaced around the circumference of the member 60. The sides of the ribs 69 lie in radial planes of the members 60 and 61 and the outer surfaces of the ribs 69 lie in an imaginary cylindrical surface that is coaxial with the members 60 and 61. The outer member 61 is formed with three ribs 70, which extend radially inwards and are equally spaced around the inner circumference of the outer member 61. The sides of the ribs 70 lie in radial planes of the members 60 and 61 and the inner surfaces of the ribs 70 lie in an imaginary cylindrical surface that is coaxial with the members 60 and 61. When the coupling is not under load, each rib 70 is situated exactly midway between each adjacent pair of ribs 69.

Mounted in the annular region between the inner member 60 and the outer member 61 are two sets of flexible bellows 12 and 12a, each of which sets consists of three bellows. The six bellows 12 and 12a are mounted one between each adjacent pair of ribs 69 and 70 and with their axes extending circumferentially with respect to the axis of the coupling so that one end of each bellows bears against a side face of a rib 69 and the other end bears against the opposing side face of a rib 70. The bellows of the set 12 are arranged alternately with the bellows of the set 12a and therefore relative rotation between the members 60 and 61 in one sense causes the bellows 12 to be compressed and allows the bellows 12a to expand while relative rotation in the other sense causes the bellows 12a to be compressed and allows the bellows 12 to expand.

Formed in the inner member 60 are two vessels in the form of similar cylindrical cavities 13 and 13a, which are each coaxial with the member 60. Three ducts 14, formed in part by bores in the member 60, provide communication between the interiors of the bellows 12 and the interior of the cavity 13, and three similar ducts 14a provide communication between the interiors of the bellows 12a and the interior of the cavity 13a. Each of the ducts 14 and 14a enters the bellows 12 or 12a at a point adjacent to the associated outwardly extending rib 69 so that relative rotation between the members 60 and 61 does not alter the dimensions or configurations of any of the ducts 14 and 14a.

In addition to being in communication with one another through the ducts 14 and the cavity 13, the interiors of the bellows 12 are also in communication with one another through a conduit formed by a circular groove 71 at one end of the outer member 61 and three ducts 72, which are formed in part by bores in the outer member 61 and lead from the bellows 12 to the circular groove 71. Similarly, the interiors of the bellows 12a are also in communication with one another through a conduit formed by a circular groove 71a at the other end of the outer member 61 and three ducts 72a, which are formed in part by bores in the outer member 61 and lead from the bellows 12a to the circular groove 71a. The ducts 72 and 72a enter the bellows 12 or 12a respectively at points adjacent to the associated inwardly extending ribs 70 so that relative rotation between the members 60 and 61 does not cause any change in the dimensions or configuration of the ducts 72 and 72a.

The bellows 12 and 12a, grooves 71 and 71a, and the ducts 72 and 72a are filled with a liquid, but the cavities 13 and 13a and the ducts 14 and 14a are each filled with a gas. Thus each system consisting of a bellows 12, cavity 13 and duct 14 and each system consisting of a bellows 12a, cavity 13a and duct 14a constitutes a fluid vibration isolator similar to that shown in FIGURE 3, the only important difference being that the cavities 13 and 13a each serve as the vessel of three vibration isolators and that the interior of the bellows of each vibration isolator is in communication with the interior of the bellows of two other vibration isolators.

All the bellows 12 and 12a have the same dimensions and the same thing applies to the ducts 14 and 14a and the cavities 13 and 13a so that each of the vibration isolators has the same static stiffness and provides the same attenuation at a given frequency and load. The application of a torque to one of the shafts 63 and 66 causes a corresponding force to be applied to one or other (which one depends upon the sense of the torque) of the two sets of vibration isolators. Thus the coupling serves to transmit a constant torque from the shaft 63 (or the shaft 66) to the other, while at the same time isolating from the shaft 66 (or the shaft 63) a periodic torque applied to the shaft 63 (or the shaft 66).

From Equation 12 in the analysis of the fluid vibration isolator, it can be seen that $$\frac{F_s}{F_0}$$

is a function of a number of quantities of which all except $\gamma_1$ are independent of $\omega_2$. Now, if a gas is used in the vessel 13, then $$\gamma_1{}^2 \alpha \frac{\omega^2}{\rho}$$

and so, if $\rho\alpha\omega^2$, then $\gamma_1$, would be independent of $\omega$. Under these circumstances, $$\frac{F_s}{F_0}$$

would be independent of $\omega$, that is to say, the attenuation provided by the vibration isolator would be independent of the frequency of the applied force.

In the rotary coupling, the pressure in the bellows 12 and 12a is proportional to the torque transmitted by the coupling. Thus, if the transmitted torque were to be proportional to the square of the frequency of the varying component of the torque, then the attenuation provided would be independent of that frequency. Now the torque required to drive the screw of a vessel is proportional to the square of the rate of rotation of the screw so that, if the rotary coupling is used in the transmission system coupling a screw to the power unit of the vessel, it can be arranged to give, over the whole range of rotational speeds, optimum attenuation of a periodic component of the torque of which component the frequency is directly proportional to the rotational frequency of the screw.

Thus, the shaft 66 may be coupled (if desired, through gearing) to a prime mover, for example, a diesel engine, and the shaft 63 may be the propeller shaft for driving a screw. The coupling transmits a constant torque from the prime mover to the screw, but greatly attenuates a particular periodic component of the torque of which component the frequency is directly proportional to the rotational frequency of the screw. Such a periodic component of the torque may result either from a periodic variation in the torque required to drive the screw arising, for example, from the blades of the screw passing the hull of the vessel, or from periodic variations in the torque output of the prime mover.

I claim:

1. A vibration isolator for isolating from a first body a periodic force applied to a second body while at the same time transmitting to the first body a constant force applied to the second body, which vibration isolator comprises a variable-volume fluid-filled container for interposition between the said two bodies, a vessel containing a fluid which provides substantially the whole of the static stiffness of the vibration isolator, conduit means of which the effective cross-sectional area is less than the effective cross-sectional area of the said container, which contains a body of fluid and which communicates with both the interior of the said container and the interior of the said vessel and provides the sole means of such communication, wherein relative movement between the two said bodies in the said one sense causes fluid to flow in the conduit means toward the vessel against the pressure of the fluid in the vessel and relative movement between the said bodies in the opposite sense causes fluid to flow in said conduit means towards the variable-volume container under the action of the pressure of the fluid in the vessel.

2. A vibration isolator as claimed in claim 1, wherein the variable-volume container comprises a flexible bellows.

3. A vibration isolator as claimed in claim 1, wherein the effective cross-sectional area of the variable-volume fluid-filled container exceeds the effective cross-sectional area of the conduit means by a factor of at least 10.

4. A vibration isolator as claimed in claim 1, wherein the fluid in the said vessel is a liquid and there is provided in the vessel a body of gas.

5. A rotary coupling for isolating from a first body a periodic torque applied to a second body while at the same time transmitting to the first body a constant torque applied to the second body, which coupling comprises a first member for connection to one of the said bodies, a second member for connection to the other of the said bodies and rotatably mounted coaxially within the first member, a plurality of abutments extending inwards from the first member, a corresponding number of abutments extending outwards from the second member, the said inwardly and outwardly extending abutments being arranged alternately around the circumference of the inner member, a plurality of variable-volume fluid-filled containers interposed one between each pair of adjacent abutments with their directions of expansion and contraction extending substantially circumferentially with respect to the common axis of the first and second members, two vessels, each containing a fluid, a plurality of conduit means, one for each container, the effective cross-sectional area of each of which is less than the effective cross-sectional area of each of the said containers, each of which contains a body of fluid and each of which communicates with both the interior of one of the said containers and the interior of one of the said vessels, the conduit means communicating with every alternate variable-volume container communicating with one of the said two vessels and the remaining conduit means communicating with the other of the said two vessels, the masses of the said bodies of fluid contained in the conduit means, the dimensions of the conduit means, the apparent bulk modulus of the fluid in each of the two vessels and the degree of damping applied to the body of fluid contained in each of the said conduit means being such that, at a particular frequency of the periodic torque, the inertia reaction of the said bodies of fluid substantially balance the forces exerted on those bodies of fluid by the fluid in the vessels with which the conduit means containing those bodies of fluid communicate.

6. A rotary coupling as claimed in claim 5, wherein the said two vessels are each formed by cavities in the second member, which cavities have axes that substantially coincide with the axes of the first and second members, and each conduit means is formed, at least in part, by a bore which is formed in the second member and which communicates with the associated variable-volume container at a point adacent to the outwardly extending abutment that engages that variable-volume container.

7. A rotary coupling as claimed in claim 5, wherein the said two vessels are each formed by cavities in the second member, which cavities have axes that substantially coincide with the axes of the first and second members, each conduit means is formed, at least in part, by a bore which is formed in the second member and which communicates with the associated variable-volume container at a point adjacent to the outwardly extending abutment that engages that variable-volume container, and there are provided two additional conduit means of which one provides communication between the interiors of only the variable-volume containers that are in communication with one of the said vessels and of which the other additional conduit means provides communication between the interiors of only the variable-volume containers that are in communication with the other of the said vessels.

8. A rotary coupling as claimed in claim 5, wherein the fluid contained in each of the said two vessels is a gas.

9. A rotary coupling for isolating from a first body a periodic torque applied to a second body while at the same time transmitting to the first body a constant torque applied to the second body, which coupling comprises a first abutment member for connection to the first body, a second abutment member for connection to the second body and mounted for rotation relative to the first abutment member, a third abutment member rigidly connected to the first abutment member, the arrangement being such that relative rotation between the first and second abutment members in one sense causes the first and second abutment members to approach one another and relative rotation between the first and second abutment members in the reverse sense causes the first and second members to approach one another, two variable-volume fluid-filled containers interposed one between the first and second abutment members and the other between the second and third abutment members, two vessels each containing a gas, two conduit means of each of which the cross-sectional area is less than the effective cross-sectional area of each of the said containers, which each contain a body of fluid and which each communicate with the interior of one of the said vessels and the interior of one of the said containers, the masses of the said bodies of fluid, the dimensions of each of the said conduit means, the apparent bulk modulus of the gas in each of the said vessels and the degree of damping applied to the said bodies of fluid being such that, at a particular frequency of the periodic torque, the inertia reaction of the masses of the said bodies of fluid substantially balance the force exerted on those bodies of fluid by the gas in the vessel with which the conduit means that contains those bodies of fluid communicates.

10. A rotary coupling for isolating from a first body a periodic torque applied to a second body while at the same time transmitting to the first body a constant torque applied to the second body, which coupling comprises a first abutment member for connection to the first body, a second abutment member for connection to the second body and mounted for rotation relative to the first abutment member, a variable-volume fluid-filled container interposed between the said two abutment members, a vessel containing a fluid, conduit means of which the effective cross-sectional area is less than the effective cross-sectional area of the said container, which contains a body of fluid and which communicates with both the interior of the said container and the interior of the said vessel, a third abutment member fixed with respect to the first abutment member, the arrangement being such that relative rotation between the first and second abutment members in one sense causes the first and second abutment members to approach one another and relative rotation between the first and second abutment members in the reverse sense causes the second and third abutment members to approach one another, a second variable-volume fluid-filled container interposed between the second and third abutment members, a second vessel containing a fluid, and a second conduit means of which the effective cross-sectional area is less than the effective cross-sectional area of the second container, which contains a body of fluid and which communicates with both the interior of the second container and the interior of the second vessel, the mass of said bodies of fluid contained in the said first and second conduit means, the dimensions of the first and second conduit means, the apparent bulk modulus of the fluids in the first and second vessels and the degree of damping applied to the bodies of fluid contained in the first and second conduit means being such that, at the said particular frequency of the periodic torque, the inertia reactions of the masses of the said bodies of fluid contained in the first and second conduit means substantially balance the forces exerted on those bodies of fluid by the fluid in the first and second vessels.

References Cited in the file of this patent
UNITED STATES PATENTS

| | | |
|---|---|---|
| Re. 20,887 | Mercier | Oct. 18, 1938 |
| 527,632 | Verity | Oct. 16, 1894 |
| 989,958 | Frahm | Apr. 18, 1911 |
| 1,734,043 | Nelson | Nov. 5, 1929 |
| 1,917,094 | Carlson | July 4, 1933 |
| 1,973,510 | Schieferstein | Sept. 11, 1934 |
| 2,002,517 | Balduf | May 28, 1935 |
| 2,524,405 | Storrs | Oct. 31, 1950 |
| 2,683,570 | Miller | July 12, 1954 |

FOREIGN PATENTS

| | | |
|---|---|---|
| 782,933 | Great Britain | Sept. 18, 1957 |